(12) United States Patent
Takai et al.

(10) Patent No.: US 9,875,177 B2
(45) Date of Patent: Jan. 23, 2018

(54) INFORMATION PROCESSING DEVICE AND PATH DETERMINATION METHOD

(71) Applicant: FUJITSU LIMITED, Kawasaki-shi, Kanagawa (JP)

(72) Inventors: Tomoyasu Takai, Kawasaki (JP); Tetsuya Kamino, Kawasaki (JP); Makoto Kozawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 248 days.

(21) Appl. No.: 14/700,294

(22) Filed: Apr. 30, 2015

(65) Prior Publication Data
US 2015/0331822 A1  Nov. 19, 2015

(30) Foreign Application Priority Data

May 15, 2014  (JP) ................................ 2014-101263

(51) Int. Cl.
*G06F 12/02* (2006.01)
*G06F 15/173* (2006.01)
(Continued)

(52) U.S. Cl.
CPC .......... *G06F 12/02* (2013.01); *G06F 12/0246* (2013.01); *G06F 12/06* (2013.01);
(Continued)

(58) Field of Classification Search
CPC .... G06F 12/02; G06F 15/17312; G06F 12/06; G06F 13/40; G06F 12/0246; G06F 12/0646; G06F 13/4022; G06F 2212/7206
See application file for complete search history.

(56) References Cited

U.S. PATENT DOCUMENTS 5,471,580 A * 11/1995 Fujiwara ........... G06F 15/17381
709/238
6,775,274 B1 * 8/2004 Ain ..................... H04L 63/0428
370/360
(Continued)

FOREIGN PATENT DOCUMENTS

| JP | 05-204876 | 8/1993 |
| JP | 2003-510720 | 3/2003 |
| WO | WO 01/24029 A2 | 4/2001 |

*Primary Examiner* — Idriss N Alrobaye
*Assistant Examiner* — Ronald Modo
(74) *Attorney, Agent, or Firm* — Oblon, McClelland, Maier & Neustadt, L.L.P.

(57) ABSTRACT

An information processing device includes a plurality of processors each of which is coupled to at least some of the plurality of processors. A first processor from among the plurality of processors is configured to calculate a plurality of communication paths between a second processor and a third processor from among the plurality of processors, identify a communication path that does not pass through a processor that is a target of dynamic reconfiguration, as a path to be used, from among the plurality of calculated communication paths, and transmit information on the identified path to be used, to a processor on the identified communication path. The processor that receives from the first processor the information on the identified path executes communication processing between the second processor and the third processor, by using the communication path that is indicated by the received information on the path to be used.

8 Claims, 36 Drawing Sheets

(51) Int. Cl.
*G06F 13/40* (2006.01)
*G06F 12/06* (2006.01)

(52) U.S. Cl.
CPC .......... *G06F 12/0646* (2013.01); *G06F 13/40* (2013.01); *G06F 13/4022* (2013.01); *G06F 15/17312* (2013.01); *G06F 2212/7206* (2013.01)

(56) References Cited

U.S. PATENT DOCUMENTS

| | | | |
|---|---|---|---|
| 2008/0069123 A1* | 3/2008 | Nagata | H04J 14/0227 370/401 |
| 2012/0120959 A1* | 5/2012 | Krause | G06F 15/17381 370/392 |

* cited by examiner

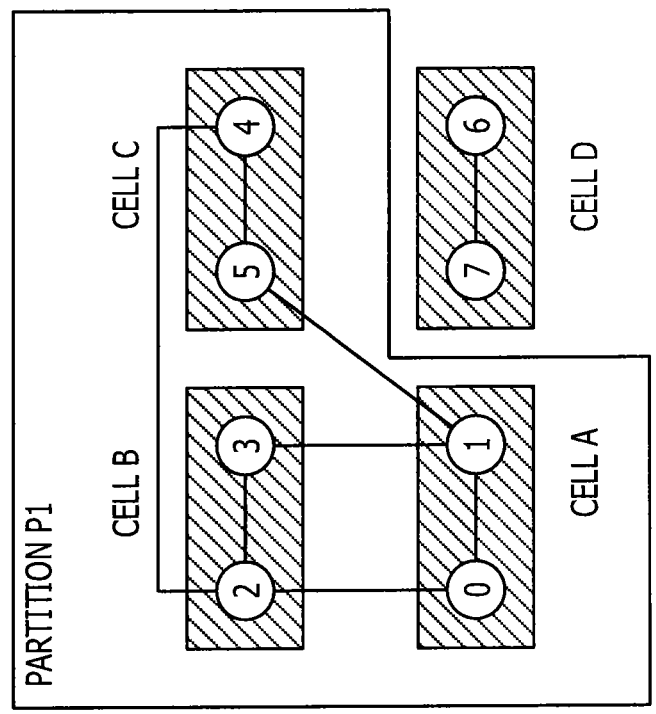
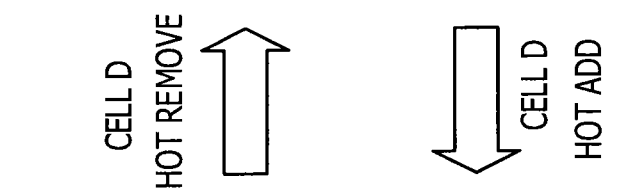
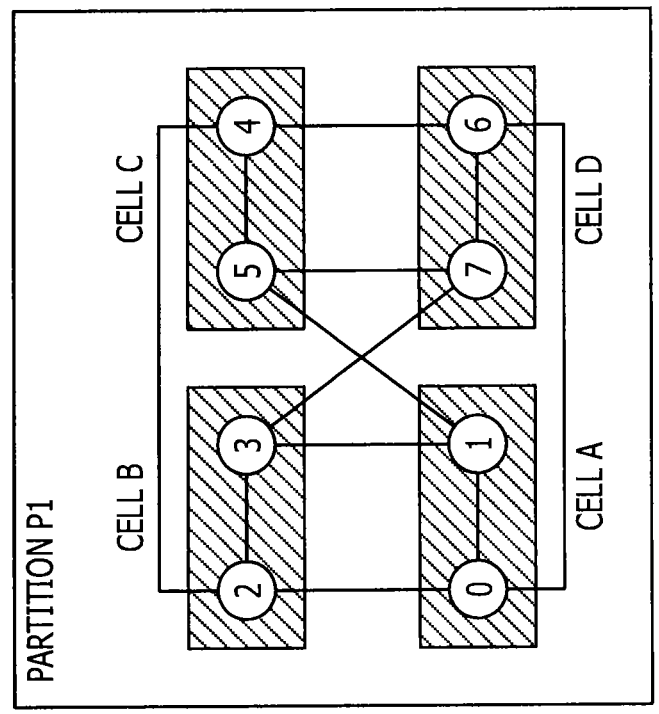
FIG. 5

FIG. 11

| CPU | CONNECTION 1 | CONNECTION 2 | CONNECTION 3 |
|---|---|---|---|
| CPU0 | CPU1 | CPU2 | CPU5 |
| CPU1 | CPU0 | CPU3 | CPU7 |
| CPU2 | CPU0 | CPU3 | CPU4 |
| CPU3 | CPU1 | CPU2 | CPU7 |
| CPU4 | CPU2 | CPU5 | CPU6 |
| CPU5 | CPU1 | CPU4 | CPU7 |
| CPU6 | CPU0 | CPU4 | CPU7 |
| CPU7 | CPU3 | CPU5 | CPU6 |

FIG. 13

| ALGORITHM | TRANSMISSION SOURCE CPU | | INTERMEDIATE CPU | | INTERMEDIATE CPU | | DESTINATION CPU |
|---|---|---|---|---|---|---|---|
| 1 | CPU0 | → | | | | | CPU1 |
| 1 | CPU0 | → | | | | | CPU2 |
| 2 | CPU0 | → | CPU1 | → | | | CPU3 |
| 3 | CPU0 | → | CPU1 | → | CPU5 | → | CPU4 |
| 2 | CPU0 | → | CPU1 | → | | | CPU5 |
| 1 | CPU0 | → | | | | | CPU6 |
| 3 | CPU0 | → | CPU6 | → | | | CPU7 |
| 1 | CPU1 | → | | | | | CPU0 |
| 2 | CPU1 | → | CPU0 | → | | | CPU2 |
| 1 | CPU1 | → | | | | | CPU3 |
| 3 | CPU1 | → | CPU5 | → | | | CPU4 |
| 1 | CPU1 | → | | | | | CPU5 |
| 2 | CPU1 | → | CPU0 | → | | | CPU6 |
| 3 | CPU1 | → | CPU0 | → | CPU6 | → | CPU7 |
| 1 | CPU2 | → | | | | | CPU0 |
| 2 | CPU2 | → | CPU0 | → | | | CPU1 |
| 1 | CPU2 | → | | | | | CPU3 |
| 1 | CPU2 | → | | | | | CPU4 |
| 2 | CPU2 | → | CPU0 | → | CPU1 | → | CPU5 |
| 2 | CPU2 | → | CPU0 | → | | | CPU6 |
| 3 | CPU2 | → | CPU0 | → | CPU6 | → | CPU7 |
| 2 | CPU3 | → | CPU1 | → | | | CPU0 |
| 1 | CPU3 | → | | | | | CPU1 |
| 1 | CPU3 | → | | | | | CPU2 |
| 3 | CPU3 | → | CPU1 | → | CPU5 | → | CPU4 |
| 2 | CPU3 | → | CPU1 | → | | | CPU5 |
| 2 | CPU3 | → | CPU1 | → | CPU0 | → | CPU6 |
| 1 | CPU3 | → | | | | | CPU7 |

FIG. 14

| ALGORITHM | TRANSMISSION SOURCE CPU | INTERMEDIATE CPU | INTERMEDIATE CPU | DESTINATION CPU |
|---|---|---|---|---|
| 3 | CPU4 → | CPU5 → | CPU1 → | CPU0 |
| 3 | CPU4 → | CPU5 → | | CPU1 |
| 1 | CPU4 → | | | CPU2 |
| 3 | CPU4 → | CPU5 → | CPU1 → | CPU3 |
| 1 | CPU4 → | | | CPU5 |
| 1 | CPU4 → | | | CPU6 |
| 4 | CPU4 → | CPU5 → | | CPU7 |
| 2 | CPU5 → | CPU1 → | | CPU0 |
| 1 | CPU5 → | | | CPU1 |
| 2 | CPU5 → | CPU1 → | CPU0 → | CPU2 |
| 2 | CPU5 → | CPU1 → | | CPU3 |
| 1 | CPU5 → | | | CPU4 |
| 2 | CPU5 → | CPU1 → | CPU0 → | CPU6 |
| 1 | CPU5 → | | | CPU7 |
| 1 | CPU6 → | | | CPU0 |
| 2 | CPU6 → | CPU0 → | | CPU1 |
| 2 | CPU6 → | CPU0 → | | CPU2 |
| 2 | CPU6 → | CPU0 → | CPU1 → | CPU3 |
| 1 | CPU6 → | | | CPU4 |
| 2 | CPU6 → | CPU0 → | CPU1 → | CPU5 |
| 1 | CPU6 → | | | CPU7 |
| 3 | CPU7 → | CPU6 → | | CPU0 |
| 3 | CPU7 → | CPU6 → | CPU0 → | CPU1 |
| 3 | CPU7 → | CPU6 → | CPU0 → | CPU2 |
| 1 | CPU7 → | | | CPU3 |
| 4 | CPU7 → | CPU6 → | | CPU4 |
| 1 | CPU7 → | | | CPU5 |
| 1 | CPU7 → | | | CPU6 |

FIG. 18

| ALGORITHM | TRANSMISSION SOURCE CPU | INTERMEDIATE CPU | INTERMEDIATE CPU | DESTINATION CPU |
|---|---|---|---|---|
| 1 | CPU0 → | | | CPU1 |
| 1 | CPU0 → | | | CPU2 |
| 2 | CPU0 → | CPU1 → | | CPU3 |
| 3 | CPU0 → | CPU1 → | CPU5 → | CPU4 |
| 2 | CPU0 → | CPU1 → | | CPU5 |
| 1 | CPU0 → | | | CPU6 |
| 1 | CPU1 → | | | CPU0 |
| 2 | CPU1 → | CPU0 → | | CPU2 |
| 1 | CPU1 → | | | CPU3 |
| 3 | CPU1 → | CPU5 → | | CPU4 |
| 1 | CPU1 → | | | CPU5 |
| 2 | CPU1 → | CPU0 → | | CPU6 |
| 1 | CPU2 → | | | CPU0 |
| 2 | CPU2 → | CPU0 → | | CPU1 |
| 1 | CPU2 → | | | CPU3 |
| 1 | CPU2 → | | | CPU4 |
| 2 | CPU2 → | CPU0 → | CPU1 → | CPU5 |
| 2 | CPU2 → | CPU0 → | | CPU6 |
| 2 | CPU3 → | CPU1 → | | CPU0 |
| 1 | CPU3 → | | | CPU1 |
| 1 | CPU3 → | | | CPU2 |
| 3 | CPU3 → | CPU1 → | CPU5 → | CPU4 |
| 2 | CPU3 → | CPU1 → | | CPU5 |
| 2 | CPU3 → | CPU1 → | CPU0 → | CPU6 |

FIG. 19

| ALGORITHM | TRANSMISSION SOURCE CPU | INTERMEDIATE CPU | INTERMEDIATE CPU | DESTINATION CPU |
|---|---|---|---|---|
| 3 | CPU4 → | CPU5 → | CPU1 → | CPU0 |
| 3 | CPU4 → | CPU5 → | | CPU1 |
| 1 | CPU4 → | | | CPU2 |
| 3 | CPU4 → | CPU5 → | CPU1 → | CPU3 |
| 1 | CPU4 → | | | CPU5 |
| 1 | CPU4 → | | | CPU6 |
| 2 | CPU5 → | CPU1 → | | CPU0 |
| 1 | CPU5 → | | | CPU1 |
| 2 | CPU5 → | CPU1 → | CPU0 → | CPU2 |
| 2 | CPU5 → | CPU1 → | | CPU3 |
| 1 | CPU5 → | | | CPU4 |
| 2 | CPU5 → | CPU1 → | CPU0 → | CPU6 |
| 1 | CPU6 → | | | CPU0 |
| 2 | CPU6 → | CPU0 → | | CPU1 |
| 2 | CPU6 → | CPU0 → | | CPU2 |
| 2 | CPU6 → | CPU0 → | CPU1 → | CPU3 |
| 1 | CPU6 → | | | CPU4 |
| 2 | CPU6 → | CPU0 → | CPU1 → | CPU5 |

FIG. 21

| ALGORITHM | TRANSMISSION SOURCE CPU | INTERMEDIATE CPU | INTERMEDIATE CPU | DESTINATION CPU |
|---|---|---|---|---|
| 1 | CPU0 → | | | CPU1 |
| 1 | CPU0 → | | | CPU2 |
| 2 | CPU0 → | CPU1 → | | CPU3 |
| 3 | CPU0 → | CPU1 → | CPU5 → | CPU4 |
| 2 | CPU0 → | CPU1 → | | CPU5 |
| 1 | CPU1 → | | | CPU0 |
| 2 | CPU1 → | CPU0 → | | CPU2 |
| 1 | CPU1 → | | | CPU3 |
| 3 | CPU1 → | CPU5 → | | CPU4 |
| 1 | CPU1 → | | | CPU5 |
| 1 | CPU2 → | | | CPU0 |
| 2 | CPU2 → | CPU0 → | | CPU1 |
| 1 | CPU2 → | | | CPU3 |
| 1 | CPU2 → | | | CPU4 |
| 2 | CPU2 → | CPU0 → | CPU1 → | CPU5 |
| 2 | CPU3 → | CPU1 → | | CPU0 |
| 1 | CPU3 → | | | CPU1 |
| 1 | CPU3 → | | | CPU2 |
| 3 | CPU3 → | CPU1 → | CPU5 → | CPU4 |
| 2 | CPU3 → | CPU1 → | | CPU5 |

FIG. 22

| ALGORITHM | TRANSMISSION SOURCE CPU | INTERMEDIATE CPU | INTERMEDIATE CPU | DESTINATION CPU |
|---|---|---|---|---|
| 3 | CPU4 → | CPU5 → | CPU1 → | CPU0 |
| 3 | CPU4 → | CPU5 → | | CPU1 |
| 1 | CPU4 → | | | CPU2 |
| 3 | CPU4 → | CPU5 → | CPU1 → | CPU3 |
| 1 | CPU4 → | | | CPU5 |
| 2 | CPU5 → | CPU1 → | | CPU0 |
| 1 | CPU5 → | | | CPU1 |
| 2 | CPU5 → | CPU1 → | CPU0 → | CPU2 |
| 2 | CPU5 → | CPU1 → | | CPU3 |
| 1 | CPU5 → | | | CPU4 |

INFORMATION PROCESSING DEVICE AND PATH DETERMINATION METHOD

CROSS-REFERENCE TO RELATED APPLICATION

This application is based upon and claims the benefit of priority of the prior Japanese Patent Application No. 2014-101263, filed on May 15, 2014, the entire contents of which are incorporated herein by reference.

FIELD

The embodiments discussed herein are related to a communication technology between processors.

BACKGROUND

There is a case in which a plurality of central processing units (CPUs) are provided in a server. FIG. 1 illustrates an example of a connection configuration of a plurality of CPUs. To each of the CPUs #0 to #3 illustrated in FIG. 1, a memory and an input/output (I/O) device are coupled. Each of the CPUs #0 to #3 includes two ports that are used to couple the CPU to other CPUs, so that each of the CPUs #0 to #3 is coupled to two CPUs from among the other CPUs directly (that is, by Point to Point). For example, the CPU #0 is coupled to the CPUs #1 and #2 directly, the CPU #1 is coupled to the CPU #0 and #3 directly, the CPU #2 is coupled to the CPUs #0 and #3 directly, and the CPU #3 is coupled to the CPUs #1 and #2 directly.

A communication between CPUs that are not coupled to each other directly is performed through other CPU. For example, in a case where the CPU #0 accesses a cache of the CPU #3 or a memory that is coupled to the CPU #3, the access is performed through the CPU #1 or #2. Therefore, each of the CPUs #0 to #3 includes a function to perform routing of a packet that has been received from the other CPU.

There is a case in which the above-described plurality of CPUs becomes targets of dynamic reconfiguration. The dynamic reconfiguration is to perform addition and removal of hardware such as a CPU without stopping the operation of a system. As the dynamic reconfiguration, there are "Hot Add" and "Hot Remove". "Hot Add" is executed, for example, to improve the performance of the system. "Hot Remove" is executed, for example, to remove hardware in which it is probable that a failure occurs, in advance.

However, when a CPU is removed by the Hot Remove, there may be a case in which a communication between CPUs is not performed as long as a communication path is not changed. For example, in FIG. 1, it is assumed that a communication between the CPUs #0 and #3 is performed using a communication path that passes through the CPU #2. In this case, in a case where the CPU #2 is removed by the Hot Remove, a communication between the CPUs #0 and #3 is not performed unless the path is changed to a communication path that passes through the CPU #1. However, there is a CPU for which the communication path is not allowed to be changed during the operation. In a related art, such a problem is not considered.

As documents of technologies in the related art, there are Japanese Laid-open Patent Publication No. 5-204876, and Japanese National Publication of International Patent Application No. 2003-510720.

SUMMARY

According to an aspect of the invention, an information processing device includes a plurality of processors each of which is coupled to at least some of the plurality of processors. A first processor from among the plurality of processors is configured to calculate a plurality of communication paths between a second processor and a third processor from among the plurality of processors, identify a communication path that does not pass through a processor that is a target of dynamic reconfiguration, as a path to be used, from among the plurality of calculated communication paths, and transmit information on the identified path to be used, to a processor on the identified communication path. The processor that receives from the first processor the information on the identified path executes communication processing between the second processor and the third processor, by using the communication path that is indicated by the received information on the path to be used.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating dynamic reconfiguration;

FIG. 11 illustrates an example of a topology graph;

FIG. 13 illustrates an example of paths in a case of eight CPUs;

FIG. 14 illustrates an example of paths in the case of the eight CPUs;

FIG. 18 illustrates an example of paths in the case of the seven CPUs;

FIG. 19 illustrates an example of paths in the case of seven CPUs;

FIG. 21 illustrates an example of paths in a case of six CPUs;

FIG. 22 illustrates an example of paths in the case of the six CPUs;

DESCRIPTION OF EMBODIMENTS

According to an aspect of embodiments discussed herein, it is possible to use an identical communication path before and after dynamic reconfiguration of a CPU. Embodiments are described below with reference to drawings.

Figure 1:
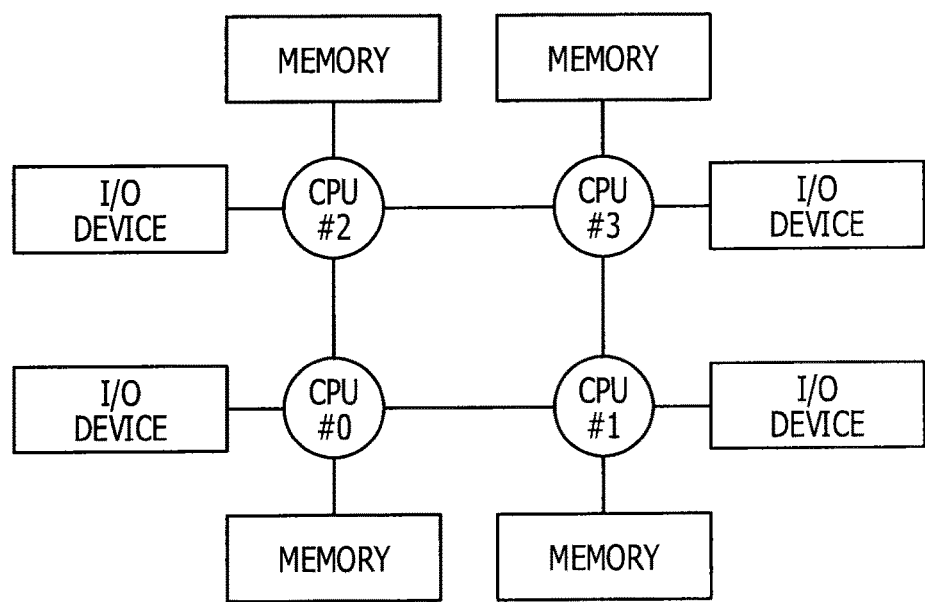
FIG. 1 illustrates a connection configuration of CPUs.
Figure 2:
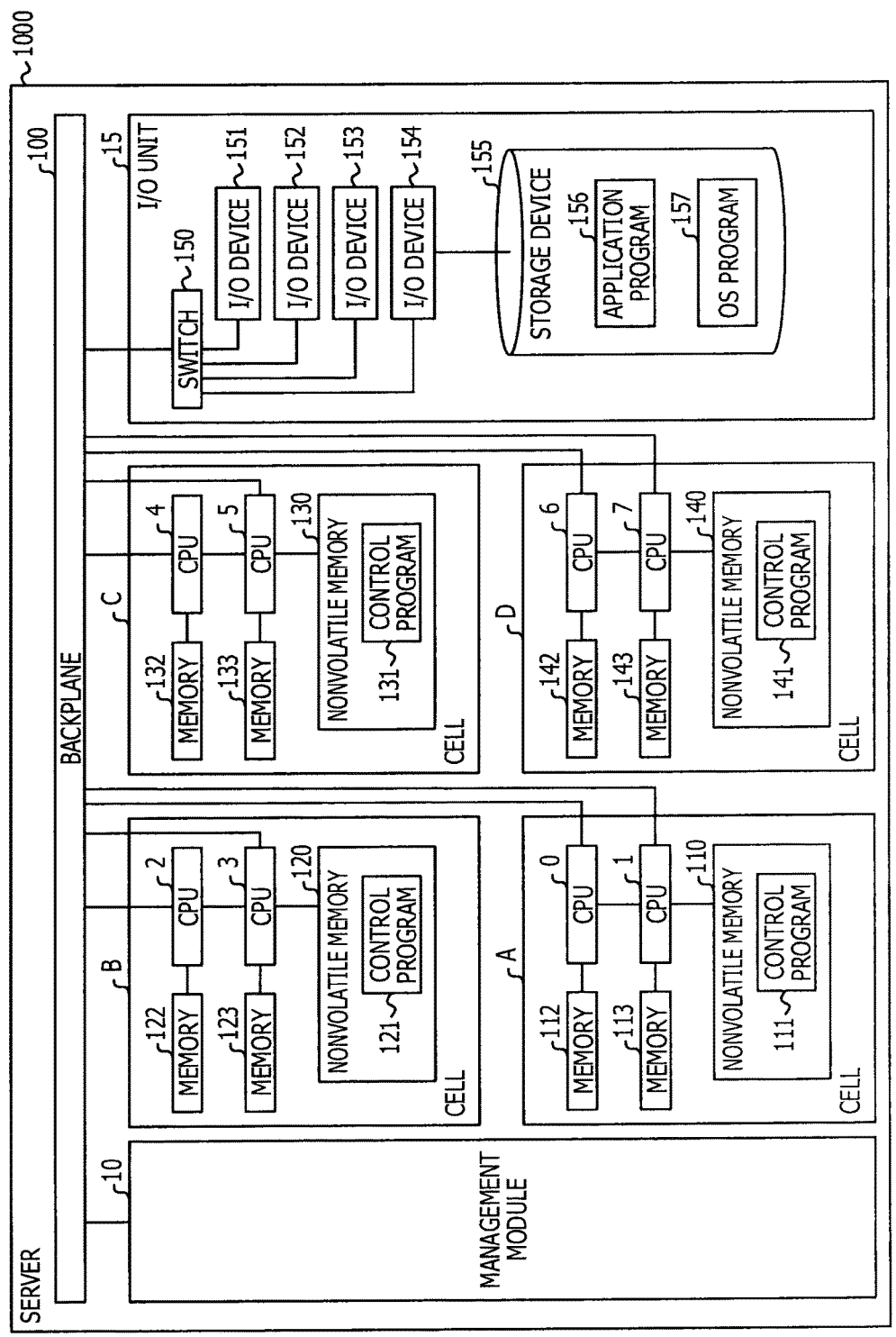
FIG. 2 illustrates a configuration of a server according to an embodiment.

FIG. 2 illustrates a configuration of a server 1000 according to the embodiment. In the server 1000, a management module 10, cells A to D, and an I/O unit 15 are coupled to each other through a backplane 100. The cell is a board (for example, a system board) that includes one or a plurality of CPUs, one or a plurality of memories, and a nonvolatile memory. The server 1000 is a multi-partition computer system, and includes a plurality of partitions each of which includes one or a plurality of cells. Each of the partitions may operate as a physically independent computer system.

The management module 10 performs management of a partition that includes one or a plurality of cells. For example, the management module 10 accepts an instruction of generation of a partition, from an administrator or the like of the server 1000, and generates the partition by combining the cells A to D in accordance with the accepted instruction. In addition, the management module 10 accepts an instruction of power control of the partition, from the administrator or the like of the server 1000, and controls the power of the partition in accordance with the accepted instruction.

Figure 3:
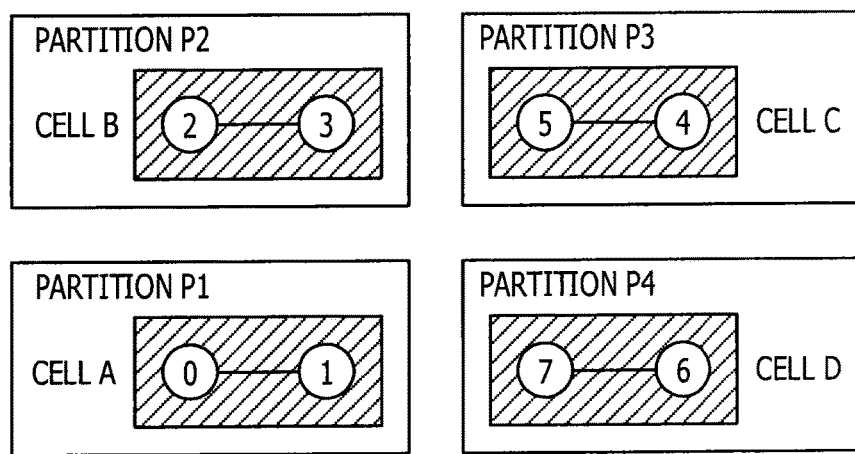
FIG. 3 illustrates an example of partitions.
Figure 4:
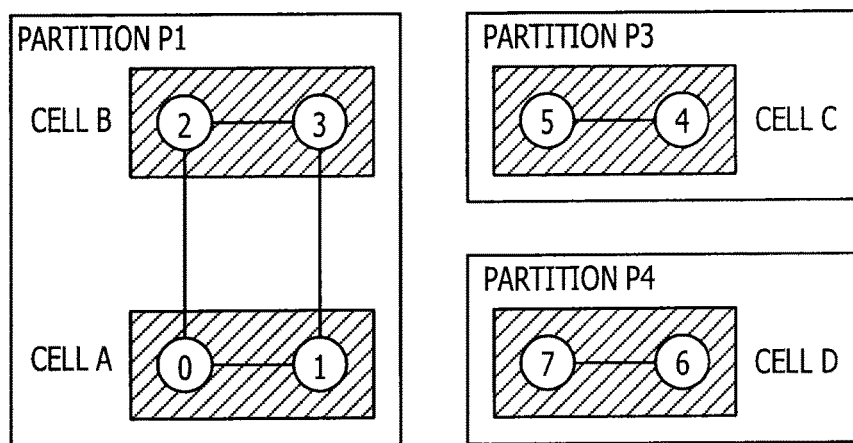
FIG. 4 illustrates an example of partitions.

FIGS. 3 and 4 illustrates an example of partitions. In the example of FIG. 3, there are a partition P1 that includes the cell A, a partition P2 that includes the cell B, a partition P3 that includes the cell C, and a partition P4 that includes the cell D. In the example of FIG. 4, there are a partition P1 that includes the cell A and the cell B, a partition P3 that includes the cell C, and a partition P4 that includes the cell D.

A dynamic reconfiguration in the embodiment is described below with reference to FIG. 5. In the example of FIG. 5, the cell D is a target of the dynamic reconfiguration. When the Hot Remove is executed for the cell D in the partition P1 that includes the cells A, B, C and D, the cell D is removed from the partition P1. On the other hand, when the Hot Add of the cell D is executed for the partition P1 that includes the cell A, B and C, the cell D is added to the partition P1.

In the embodiment, any one of the cells that are included in the partition is a control cell. The control cell is a cell that includes a control CPU, and is not a target of the dynamic reconfiguration. The control CPU is a CPU that executes the control program, and starts up an Operating System (OS). A CPU that becomes the control CPU from among CPUs that are included in the control cell is determined, for example, at the time of manufacturing of the cell.

Returning to the description of FIG. 2, the cell A includes the CPUs 0 and 1, a nonvolatile memory 110 that stores a control program 111, memories 112 and 113. For example, it is assumed that the cell A is the control cell, and the CPU 0 is the control CPU. In this case, the CPU 0 reads the control program 111 that is stored in the nonvolatile memory 110, and executes the control program 111. In addition, the CPU 0 reads an OS program 157 that is stored in a storage device 155, and stores the OS program 157 in the memory 112. In addition, the CPU 0 executes the OS program 157 that is stored in the memory 112. After start-up of the OS, the CPUs 0 and 1 read an application program 156 that is stored in the storage device 155, and store the application programs 156 in the memories 112 and 113, respectively. In addition, the CPUs 0 and 1 execute the application programs 156 that are respectively stored in the memory 112 and 113.

The configurations of the cell B to D are similar to that of the cell A, so that the description is omitted herein.

Figure 6:
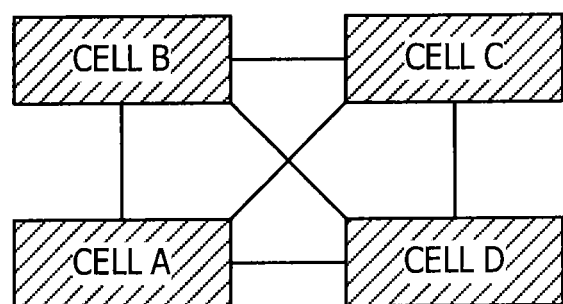
FIG. 6 is a diagram illustrating a connection relationship of cells.

Connection relationships among the cells A to D are described below with reference to FIGS. 6 and 7. As illustrated in FIG. 6, the cells A to D are coupled to each other. For example, the cell A is directly coupled to the cells B, C, and D, and the cell B is directly coupled to the cells A, C, and D, and the cell C is directly coupled to the cells A, B and D, and the cell D is directly coupled to the cells A, B, and C. Therefore, even when any one of the cells A to D is a control cell, the cells other that the control cell are directly coupled to the control cell.

Figure 7:
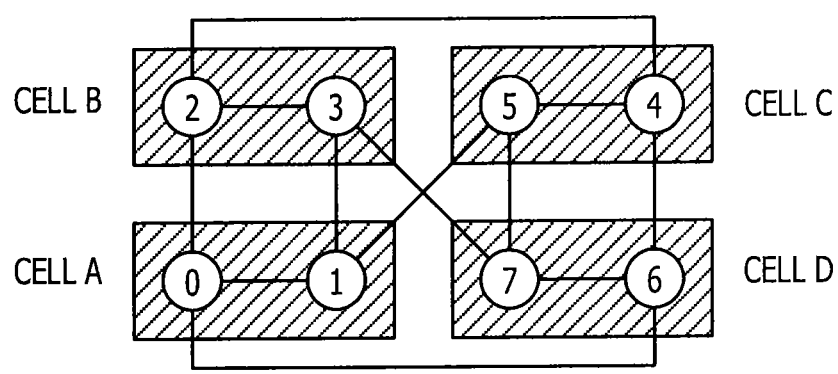
FIG. 7 is a diagram illustrating a connection relationship of cells.

FIG. 7 illustrates the detailed connection relationship. The CPU 0 is directly coupled to the CPUs 1, 2, and 6, and the CPU 1 is directly coupled to the CPUs 0, 3, and 5, and the CPU 2 is directly coupled to the CPUs 0, 3, and 4, and the CPU 3 is directly coupled to the CPUs 1, 2, and 7, and the CPU 4 is directly coupled to the CPUs 2, 5, and 6, and the CPU 5 is directly coupled to the CPUs 1, 4, and 7, and the CPU 6 is the CPUs 0, 4 and, 7, and the CPU 7 is directly coupled to the CPUs 3, 5, and 6.

Returning to the description of FIG. 2, in the I/O unit 15, a switch 150 that performs relay of data is coupled to, for example, I/O devices 151 to 154 such as a card that is used to perform connection with a hard disk and a network interface card (NIC). To the I/O device 154, the storage device 155 such as a hard disk is coupled. In the storage device 155, the application program 156 and the OS program 157 are stored.

Figure 8:
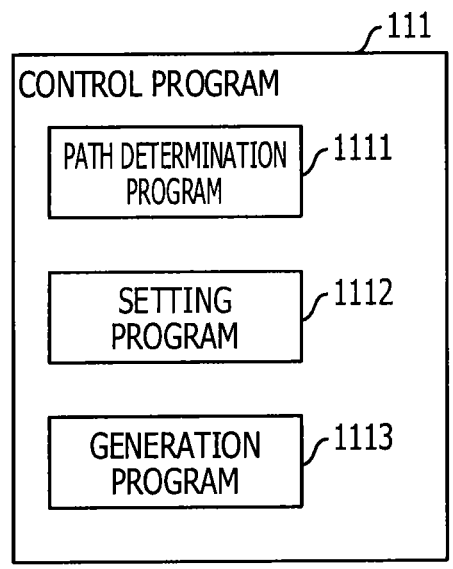
FIG. 8 is a diagram illustrating a control program.

The control program 111 is described below with reference to FIG. 8. The control program 111 includes programs that are used to perform initialization of CPUs (here, initialization of information on a path is not included), initialization of the memories and the I/O unit 15, start-up of the OS, and the like. In addition, the control program 111 includes a path determination program 1111, a setting program 1112, and a generation program 1113. The generation program 1113 is a program that is used to generate a topology graph that is data that indicates a connection relationship between CPUs. The path determination program 1111 is a program that is used to determine a communication path between the CPUs, based on the generated topology graph. The setting program 1112 is a program that is used to transmit information on the determined communication path, to the CPUs in the server 1000. Control programs 121 to 141 are similar to the control program 111, so that the description is omitted herein.

Processing that is executed by a control cell at the time of start-up of a partition is described below with reference to FIGS. 9 to 14. In the following description, it is assumed that the cell A is the control cell, and the CPU 0 is a control CPU.

First, the CPU 0 that is the control CPU reads the control program 111 from the nonvolatile memory 110, and starts execution of the control program 111. In addition, the CPU 0 executes path determination processing using the path determination program 1111 that is included in the control program 111 (FIG. 9: Step S1). The path determination processing is described with reference to FIGS. 10 and 11.

First, the CPU 0 calls the generation program 1113. In addition, the CPU 0 generates a topology graph that is data indicating a connection relationship among all cells including a cell that is not included in the partition (here, the CPUs 0 to 7), based on the actual connection relationship among the CPUs 0 to 7 (FIG. 10: Step S11). In addition, the CPU 0 terminates the execution of the generation program 1113. The actual connection relationship is calculated, for example, based on the cell information that has been obtained from the management module 10. FIG. 11 illustrates an example of a topology graph. In the example of FIG. 11, in each of the CPUs 0 to 7, identification information on CPUs that are directly coupled to each of the CPUs 0 to 7 is stored.

The CPU 0 selects a single non-processed CPU from the CPUs 0 to 7 (Step S13). In the following description, the CPU that has been selected in Step S13 is referred to as a transmission source CPU.

The CPU 0 executes selection processing (Step S15). The selection processing is described below with reference to FIG. 12.

Figure 12:
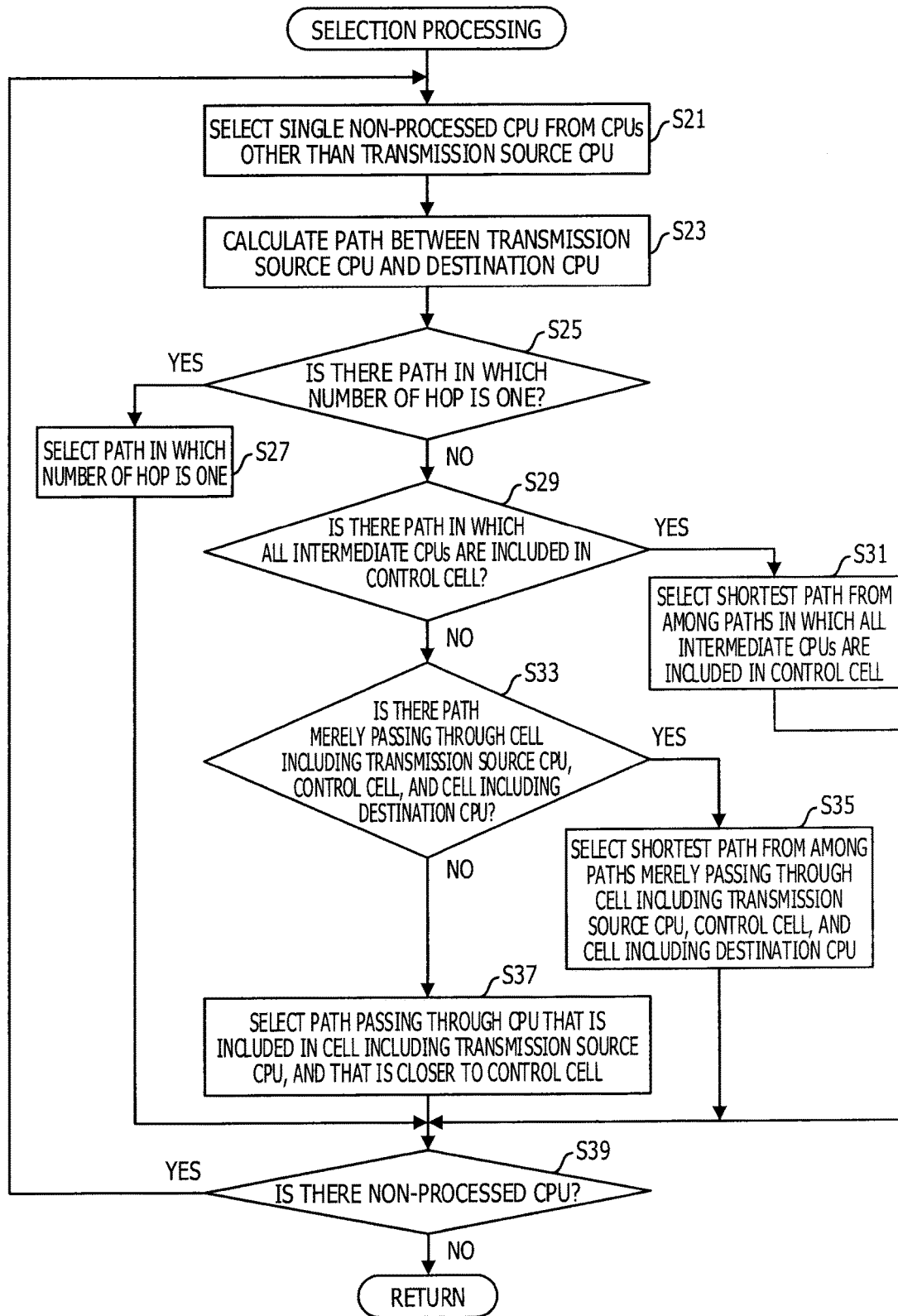
FIG. 12 illustrates a processing flow of selection processing.

First, the CPU 0 identifies a single non-processed CPU from the CPUs other than the transmission source CPU (FIG. 12: Step S21). Hereinafter, the CPU that has been identified in Step S21 is referred to as a destination CPU.

The CPU 0 calculates a path between the transmission source CPU and the destination CPU, using the topology graph that has been generated in Step S11 (Step S23). In Step S23, all paths in which the number of hops is a certain number (three in the embodiment) or less are obtained. For example, in a case where the transmission source CPU is the CPU 6, and the destination CPU is the CPU 1, a path "CPU 6→CPU 0→CPU 1", a path "CPU 6→CPU 7→CPU 3→CPU 1", a path "CPU 6→CPU 7→CPU 5→CPU 1", and a path "CPU 6→CPU 4→CPU 5→CPU 1" are calculated. Here, the number of hops is, for example, the number of CPUs on a path from the transmission source CPU to the destination CPU (The number of hops includes a count on the destination CPU, but does not include a count on the transmission source CPU. For example, number of hops of the path "CPU 6→CPU 0→CPU 1" is counted as 2 hops.).

The CPU 0 determines whether or not there is a path in which the number of hops is one, in the paths that have been calculated in Step S23 (Step S25). In a case where there is a path in which the number of hops is one (Step S25: Yes route), the CPU 0 selects the path in which the number of hops is one (Step S27). In addition, the flow proceeds to processing of Step S39. The path that is selected in Step S27 is, for example, a path "CPU 0→CPU 1".

In a case where there is no path in which the number of hops is one (Step S25: No route), the CPU 0 determines whether or not there is a path in which all intermediate CPUs are included in the control cell (cell A in the embodiment) in the paths that have been calculated in Step S23, (Step S29). The intermediate CPU is a CPU between the transmission source CPU and the destination CPU. Thus, there is no intermediate CPU in the path in which the number of hops is one.

In a case where there is a path in which all of the intermediate CPUs are included in the control cell (Step S29: Yes route), the CPU 0 selects the shortest path from the paths in which all of the intermediate CPUs are included in the control cell (Step S31). In addition, the flow proceeds to the processing of Step S39. The path that is selected in Step S31 is, for example, a path "CPU 1→CPU 0→CPU 2".

In a case where there is no path in which all of the intermediate CPUs are included in the control cell (Step S29: No route), the CPU 0 determines whether or not there is a path that merely passes through a cell that includes the transmission source CPU, the control cell, and a cell that includes the destination CPU, in the paths that have been calculated in Step S23 (Step S33).

In a case where there is a path that merely passes through the cell that includes the transmission source CPU, the control cell, and the cell that includes the destination CPU (Step S33: Yes route), the CPU 0 selects the shortest path from the paths that pass merely through the cell that includes the transmission source CPU, the control cell, and the cell that includes the destination CPU (Step S35). In addition, the flow proceeds to the processing of Step S39. The paths that have been selected in Step S35 are, for example, a path "CPU 1→CPU 0→CPU 2" and a path "CPU 4→CPU 5→CPU 1→CPU 3".

In a case where there is no path that merely passes through the cell that includes the transmission source CPU, the control cell, and the cell that includes the destination CPU (Step S33: No route), the CPU 0 selects a path that passes through a CPU that is included in the cell including the transmission source CPU and is close to the control cell as compared with the transmission source CPU (Step S37). The path that is selected in Step S37 is, for example, a path "CPU 4→CPU 5→CPU 7".

The CPU 0 determines whether or not there is a non-processed CPU in the CPUs other than the transmission source CPU (Step S39). In a case where there is a non-processed CPU (Step S39: Yes route), the next CPU is processed, so that the flow returns to the processing of Step S21. On the other hand, in a case where there is no non-processed CPU (Step S39: No route), the flow returns to the processing of Step S17.

When the above-described processing is executed, a path that is not affected by the dynamic reconfiguration (especially, the Hot Remove) may be selected. That is, "path in which the number of hops is one" does not include an intermediate CPU, so that the path is not affected by the dynamic reconfiguration. In addition, "path in which all of the intermediate CPUs are included in the control cell" is not affected by the dynamic reconfiguration because the intermediate CPUs are not targets of the dynamic reconfiguration.

In addition, in the embodiment, for "path that merely passes through the cell that includes the transmission source CPU, the control cell, and the cell that includes the destination CPU" and "path that passes through a CPU that is included in the cell including the transmission source CPU and is close to the control cell as compared with the transmission source CPU", the removal order of the CPUs and the addition order of the CPUs are determined, so that the paths are not affected by the dynamic reconfiguration. The detailed description is made later.

Figure 10:
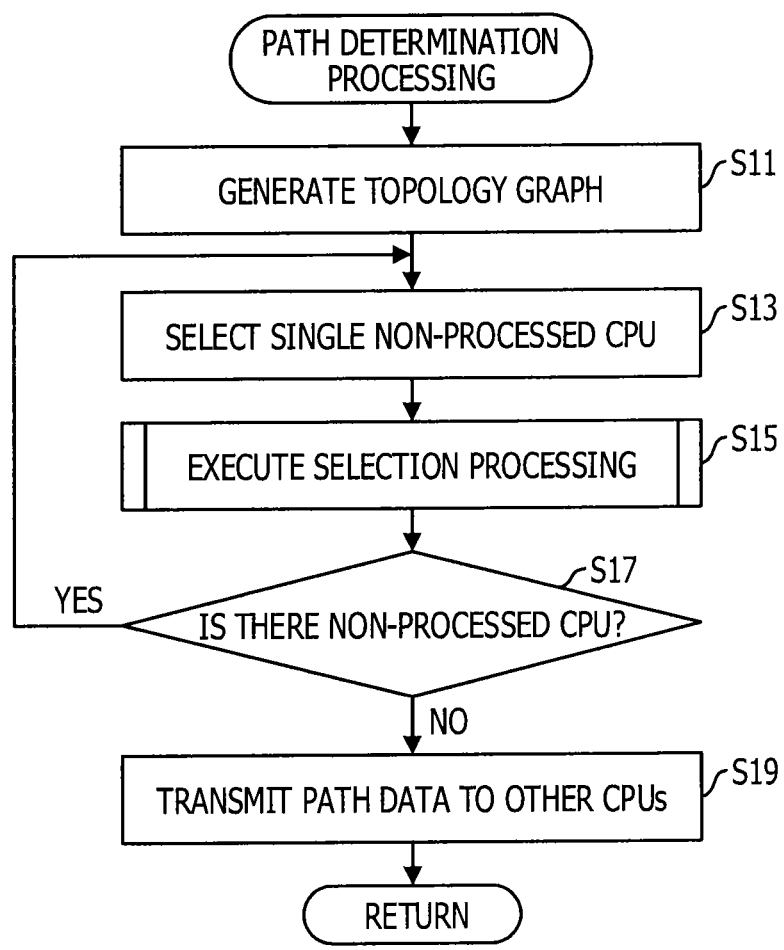
FIG. 10 illustrates a processing flow of path determination processing.

Returning to the description of FIG. 10, the CPU 0 determines whether or not there is a non-processed CPU (Step S17). In a case where there is a non-processed CPU (Step S17: Yes route), the next CPU is processed, so that the flow returns to the processing of Step S13.

In a case where there is no non-processed CPU (Step S17: No route), the CPU 0 starts execution of the setting program 1112. In addition, the CPU 0 transmits the information on the path to the other CPUs (here, the CPUs 1 to 7) (Step S19). The information on the path is transmitted to the other CPUs, for example, through the management module 10. In addition, the CPU 0 terminates execution of the setting program 1112 and the path determination program 1111, and the flow returns to the processing of Step S3. Each of the other CPUs uses the received information on the path for routing control when communication is performed for exchange of data with a CPU other than that other CPU.

FIGS. 13 and 14 illustrate examples of a path that has been determined by the path determination processing. In FIGS. 13 and 14, in the field of "algorithm", a number is stored that indicates an algorithm that has been used for determination of a path. Here, "path in which the number of hops is one" is 1, and "path in which all of the intermediate CPUs are included in the control cell" is 2, and "path that merely passes through the cell that includes the transmission source CPU, the control cell, and the cell that includes the destination CPU" is 3, and "path that passes through a CPU that is included in the cell including the transmission source CPU and is close to the control cell as compared with the transmission source CPU" is 4.

In Step S19, not all pieces of information illustrated in FIGS. 13 and 14 may not be transmitted to the other CPUs. For example, as long as pieces of data from the 8th to 14th rows (that is, data in which the transmission source CPU is the CPU 1) is transmitted to the CPU 1, the CPU 1 may perform routing.

In the embodiment, once a path is determined, the path is used fixedly. For example, a path "CPU 1→CPU 0→CPU 2" is used fixedly in a case where the CPU 1 transmits data to the CPU 2, and the other paths are not used. In addition, the determined path is not affected by the dynamic reconfiguration. Thus, a problem does not occur even when the communication path is not allowed to be changed during the operation of the CPU due to the specifications.

Figure 9:
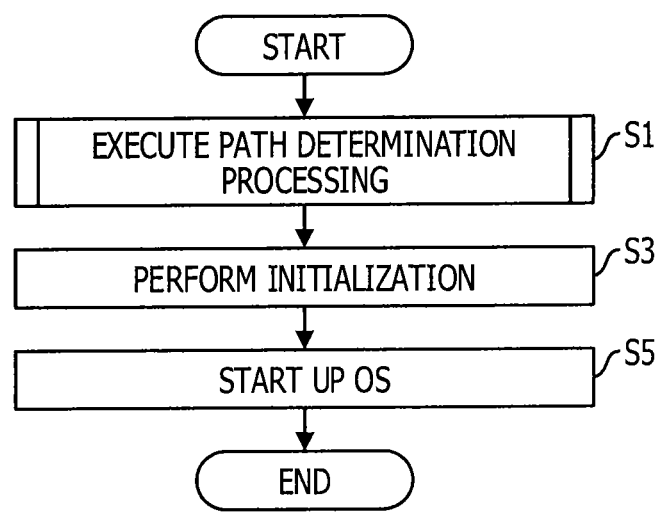
FIG. 9 illustrates a processing flow of processing that is executed by a control CPU.

Returning to the description of FIG. 9, the CPU 0 performs initialization on items other than the paths (Step S3). In Step S3, for example, initialization of the I/O unit 15, initialization of the memory 112, and the like are performed.

The CPU 0 reads the OS program 157 that is stored in the storage device 155, and stores the OS program 157 in the memory 112. In addition, the CPU 0 starts up the OS using the OS program 157 that is stored in the memory 112 (Step S5). In addition, the processing ends.

When the above-described processing is executed, the path is not affected by the dynamic reconfiguration, so that an identical path may be used before and after the dynamic reconfiguration.

Processing that is executed by the control CPU (here, the CPU 0) at the time of the dynamic reconfiguration is described below with reference to FIGS. 15 to 22. First, processing that is executed by the control CPU at time of the Hot Add is described. The processing that is described with reference to FIGS. 15 to 22 may be performed by executing the control program 111 through the control CPU.

The management module 10 accepts a designation of a cell that is to be added by the Hot Add and a partition to which the cell is added, from the administrator, or the like of the server 1000. The management module 10 notifies the CPU 0 of the designation of the cell that is to be added by the Hot Add and the partition to which the cell is added.

Figure 15:
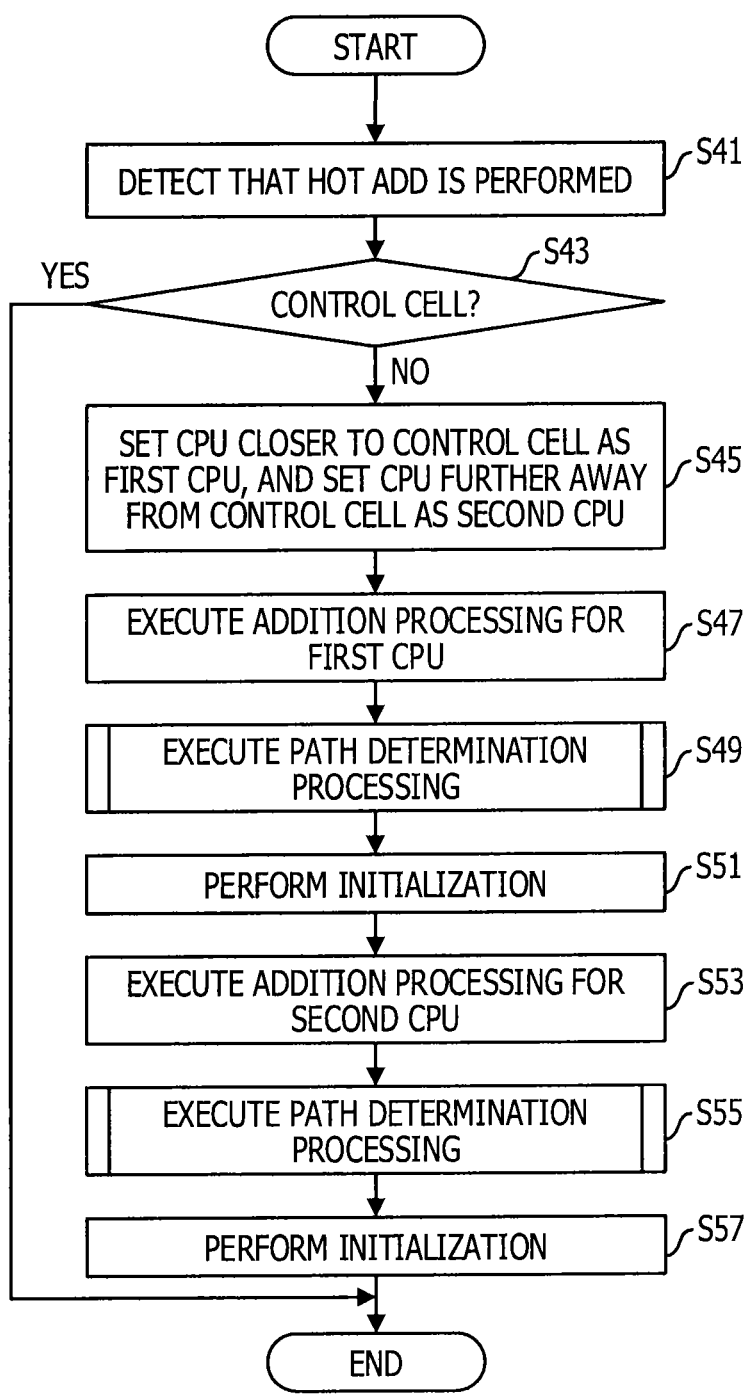
FIG. 15 illustrates a processing flow of processing that is executed by the control CPU at the time of Hot Add.

The CPU 0 detects that the Hot Add is performed when the CPU 0 receives the designation of the cell that is to be added by the Hot Add and a partition to which the cell is added, from the management module 10 (FIG. 15: Step S41).

The CPU 0 determines whether or not the cell that is to be added by the Hot Add is the control cell (that is, the cell A) (Step S43). In a case where the cell is the control cell (Step S43: Yes route), the processing ends.

In a case where the cell is not the control cell (Step S43: No route), the CPU 0 sets a CPU that is closer to the control cell as a first CPU, from among CPUs that are included in the cell that is to be added by the Hot Add. In addition, the CPU 0 sets a CPU that is further away from the control cell as a second CPU, from among the CPUs that are included in the cell that is to be added by the Hot Add (Step S45). For example, in a case where the cell that is to be added by the Hot Add is the cell D, the CPU 6 in which the number of hops to the control cell is one is the first CPU, and the CPU 7 which the number of hops to the control cell is two is the second CPU.

The CPU 0 executes addition processing for the first CPU (Step S47). For example, the state before the processing of Step S47 is executed is the state of FIG. 16, and the state after the CPU 6 has been added by the processing of Step S47 becomes the state of FIG. 17.

The CPU 0 executes the path determination processing for a system to which the first CPU has been added (Step S49). The path determination processing is described above with reference to FIGS. 10 to 12, so that the description is omitted herein. For example, when the path determination processing is executed for the state of FIG. 17, the determined paths become as illustrated in FIGS. 18 and 19. The paths of FIGS. 18 and 19 are the same as those of FIGS. 13 and 14, except that the paths in which the CPU 7 is the destination CPU and the paths in which the CPU 7 is the transmission source CPU are not illustrated.

The CPU 0 performs initialization on items other than the paths (Step S51). In Step S51, for example, initialization of a memory 142 and the like are performed.

The CPU 0 executes the addition processing for the second CPU (Step S53). For example, the state before the processing of Step S53 is executed is the state of FIG. 17, and the state becomes the state of FIG. 7 when the CPU 7 is added by the processing of Step S53.

The CPU 0 executes the path determination processing for a system to which the second CPU has been added (Step S55). The path determination processing is described above with reference to FIGS. 10 to 12, so that the description is omitted herein. For example, when the path determination processing is executed for the state as illustrated in FIG. 7, the determined paths become the paths as illustrated in FIGS. 13 and 14.

The CPU 0 performs initialization on items other than the paths (Step S57). In Step S57, for example, initialization of a memory 143 and the like are performed. In addition, the processing ends.

Processing that is executed by the control CPU at the time of the Hot Remove is described below. First, the management module 10 receives a designation of a cell that is to be removed by the Hot Remove and a partition from which the cell is removed, from the administrator or the like of the server 1000. The management module 10 notifies the CPU 0 of information on the designation of the cell that is to be removed by the Hot Remove and the partition from which the cell is removed.

Figure 20:
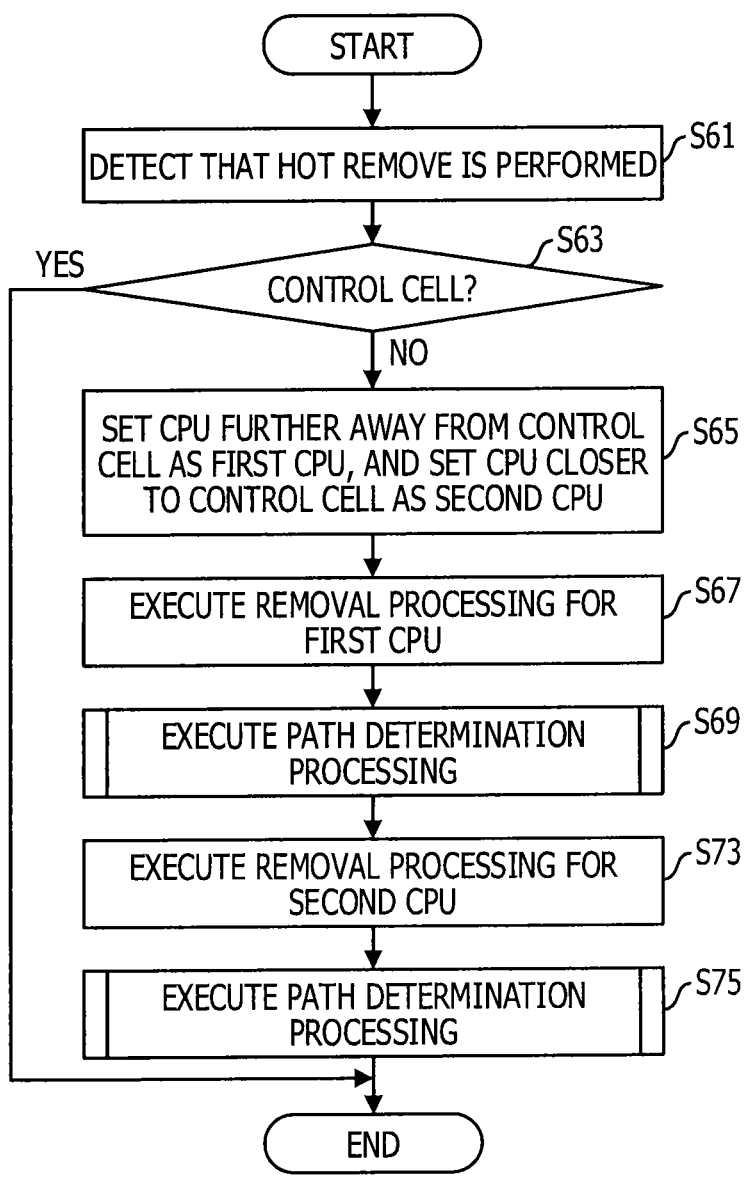
FIG. 20 illustrates a processing flow of processing that is executed by the control CPU at the time of Hot Remove.

The CPU 0 detects that the Hot Remove is performed when the CPU 0 receives the designation of the cell that is to be removed by the Hot Remove and the partition from which the cell is removed from the management module 10 (FIG. 20: Step S61).

The CPU 0 determines whether or not the cell that is to be removed by the Hot Remove is the control cell (Step S63). In a case where the cell is the control cell (Step S63: Yes route), the Hot Remove is not allowed to be performed, so that the processing ends.

In a case where the cell is not the control cell (Step S63: No route), the CPU 0 sets a CPU that is further away from the control cell as a first CPU, from among CPUs that are included in the cell that is to be removed by the Hot Remove. In addition, the CPU 0 sets a CPU that is closer to the control cell as a second CPU, from among the CPUs that are included in the cell that is to be removed by the Hot Remove (Step S65). For example, in a case where the cell that is to be removed by the Hot Remove is the cell D, the CPU 7 in which the number of hops to the control cell is two is the first CPU, and the CPU 6 in which the number of hops to the control cell is one is the second CPU.

The CPU 0 executes removal processing for the first CPU (Step S67). In Step S67, for example, the state before the processing of Step S67 is executed is the state of FIG. 7, and the state after the CPU 7 has been removed by the processing of Step S67 becomes the state of FIG. 17.

Figure 17:
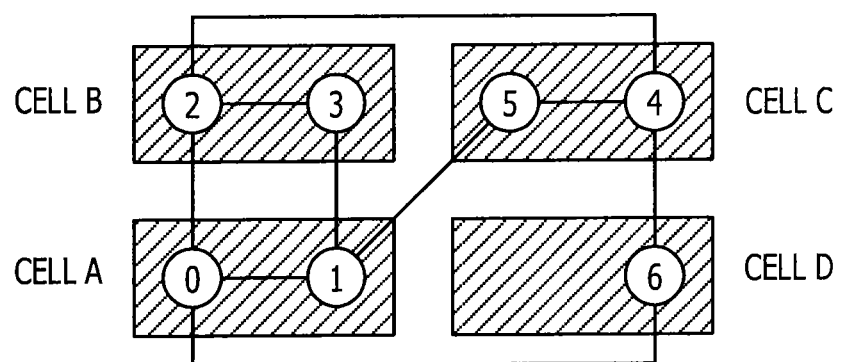
FIG. 17 illustrates a connection configuration in a case of seven CPUs.

The CPU 0 executes the path determination processing for a system from which the first CPU has been removed (Step S69). The path determination processing is described above with reference to FIGS. 10 to 12, so that the description is omitted herein. For example, when the path determination processing is executed for the state as illustrated in FIG. 17, the determined path is as illustrated in FIGS. 18 and 19. The paths illustrated in FIGS. 18 and 19 are the same as the paths illustrated in FIGS. 13 and 14, except that the paths in which the CPU 7 is the destination CPU and the paths in which the CPU 7 is the transmission source CPU are not illustrated.

The CPU 0 executes the removal processing for the second CPU (Step S73). For example, the state before the processing of Step S73 is executed is the state of FIG. 17, and the state after the CPU 6 has been removed by the processing of Step S73 becomes the state of FIG. 16.

Figure 16:
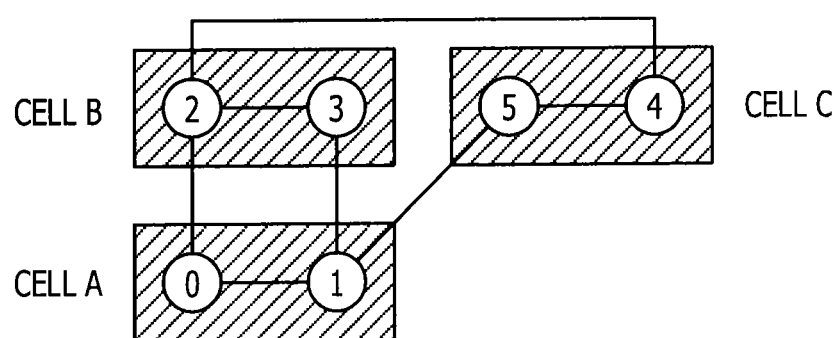
FIG. 16 illustrates a connection configuration in a case of six CPUs.

The CPU 0 executes the path determination processing for the system from which the second CPU has been removed (Step S75). The path determination processing is described above with reference to FIGS. 10 to 12, so that the description is omitted herein. For example, when the path determination processing is executed for the state as illustrated in FIG. 16, the determined paths become as illustrated in FIGS. 21 and 22. The paths illustrated in FIGS. 21 and 22 are the same as the paths illustrated in FIGS. 18 and 19, except that the paths in which the CPU 6 is the destination CPU and the paths in which the CPU 6 is the transmission source CPU are not illustrated.

As described above, the removal order of CPUs and the addition order of CPUs are determined based on the number of hops to the control cell. As a result, "path that merely passes through the cell that includes the transmission source CPU, the control cell, and the cell that includes the destination CPU" and "path that passes through a CPU that is included in the cell including the transmission source CPU and is close to the control cell as compared with the transmission source CPU" are not affected by the dynamic reconfiguration.

In the following description, the path determination is described with reference to specific examples. First, a path in which the transmission source CPU is the CPU 6 is described.

Figure 23:
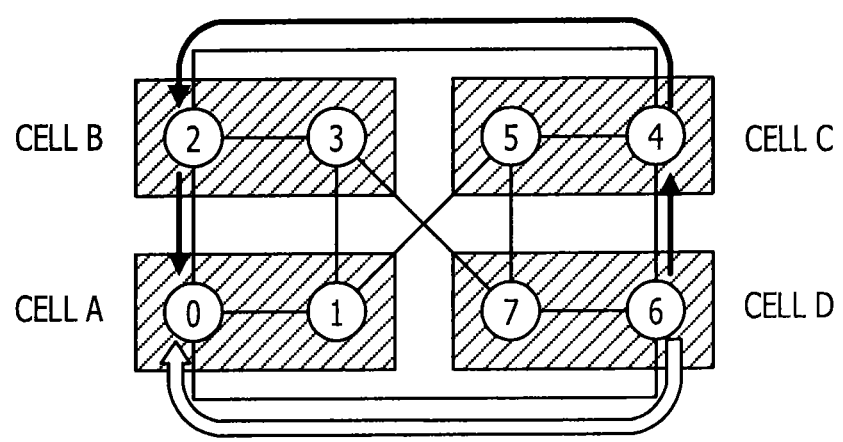
FIG. 23 is a diagram specifically illustrating a path determination method.

FIG. 23 illustrates paths in which the number of hops is three or less, from among paths from the CPU 6 to the CPU 0. In FIG. 23, a path "CPU 6→CPU 0" and a path "CPU 6→CPU 4→CPU 2→CPU 0" are illustrated. Here, as the path from the CPU 6 to the CPU, the path "CPU 6→CPU 0" in which the number of hops is one is selected.

Figure 24:
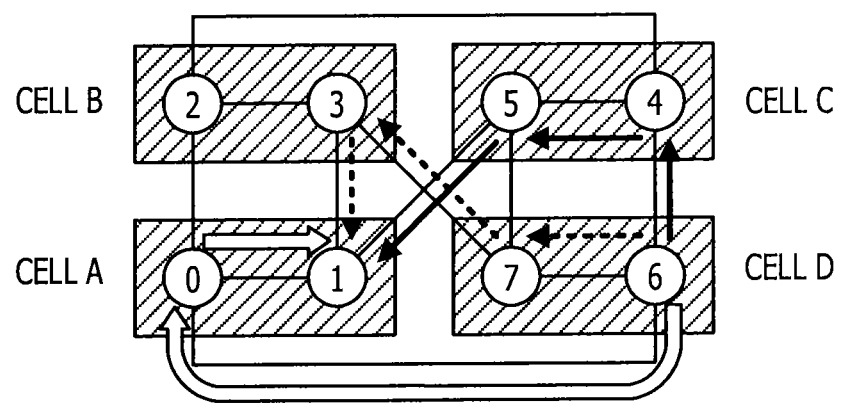
FIG. 24 is a diagram specifically illustrating the path determination method.

FIG. 24 illustrates paths in which the number of hops is three or less, from among paths from the CPU 6 to the CPU 1. In FIG. 24, a path "CPU 6→CPU 0→CPU 1", a path "CPU 6→CPU 7→CPU 3→CPU 1", and a path "CPU 6→CPU 4→CPU 5→CPU 1" are illustrated. Here, as the path from the CPU 6 to the CPU 1, the path "CPU 6→CPU 0→CPU 1" in which all of the intermediate CPUs are included in the control cell is selected.

Figure 25:
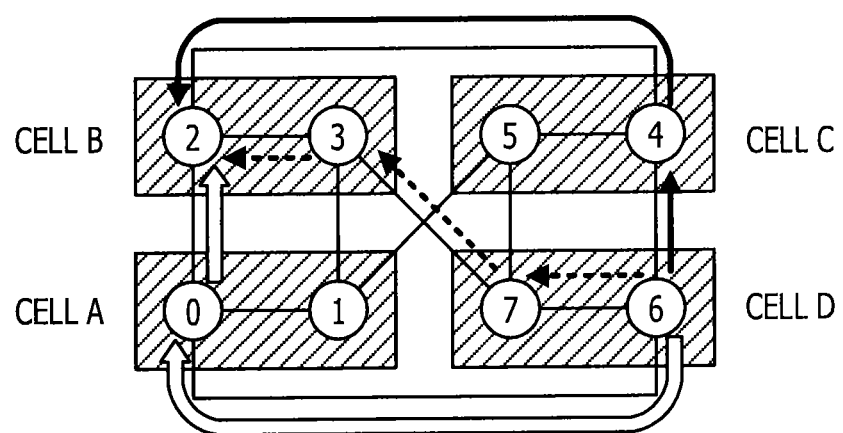
FIG. 25 is a diagram specifically illustrating the path determination method.

FIG. 25 illustrates paths in which the number of hops is three or less, from among paths from the CPU 6 to the CPU 2. In FIG. 25, a path "CPU 6→CPU 0→CPU 2", a path "CPU 6→CPU 4→CPU 2", and a path "CPU 6→CPU 7→CPU 3→CPU 2" are illustrated. Here, as the path from the CPU 6 to the CPU 2, the path "CPU 6→CPU 0→CPU 2" in which all of the intermediate CPUs are included in the control cell is selected.

Figure 26:
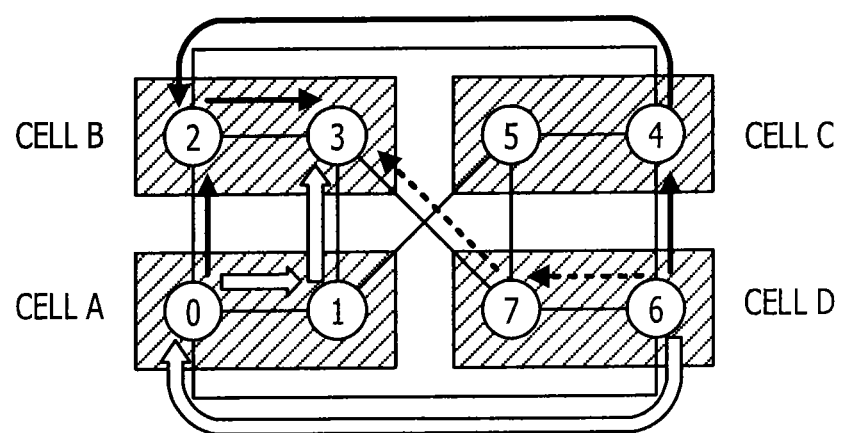
FIG. 26 is a diagram specifically illustrating the path determination method.

FIG. 26 illustrates paths in which the number of hops is three or less, from among paths from the CPU 6 to the CPU 3. In FIG. 26, a path "CPU 6→CPU 0→CPU 1→CPU 3", a path "CPU 6→CPU 0→CPU 2→CPU 3", a path "CPU 6→CPU 4→CPU 2→CPU 3", and a path "CPU 6→CPU 7→CPU 3" are illustrated. Here, as the path from the CPU 6 to the CPU 3, the path "CPU 6→CPU 0→CPU 1→CPU 3" in which all of the intermediate CPUs are included in the control cell is selected.

Figure 27:
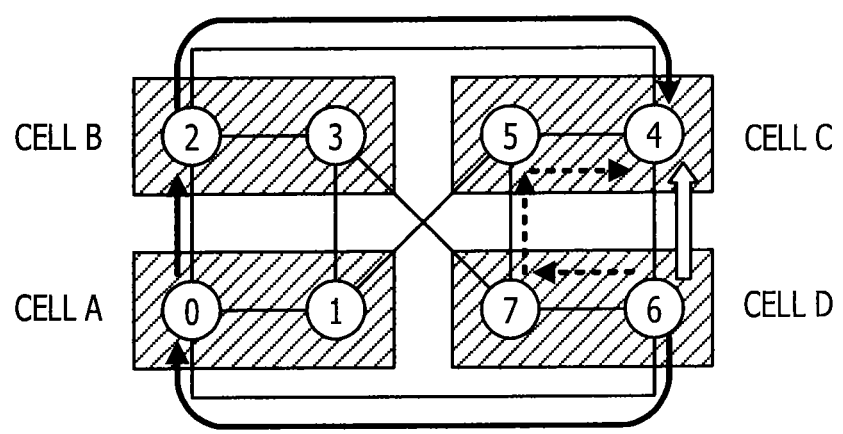
FIG. 27 is a diagram specifically illustrating the path determination method.

FIG. 27 illustrates paths in which the number of hops is three or less, from among paths from the CPU 6 to the CPU 4. In FIG. 27, a path "CPU 6→CPU 0→CPU 2→CPU 4", a path "CPU 6→CPU 4", and a path "CPU 6→CPU 7→CPU 5→CPU 4" are illustrated. Here, as the path from the CPU 6 to the CPU 4, the path "CPU 6→CPU 4" in which the number of hops is one is selected.

Figure 28:
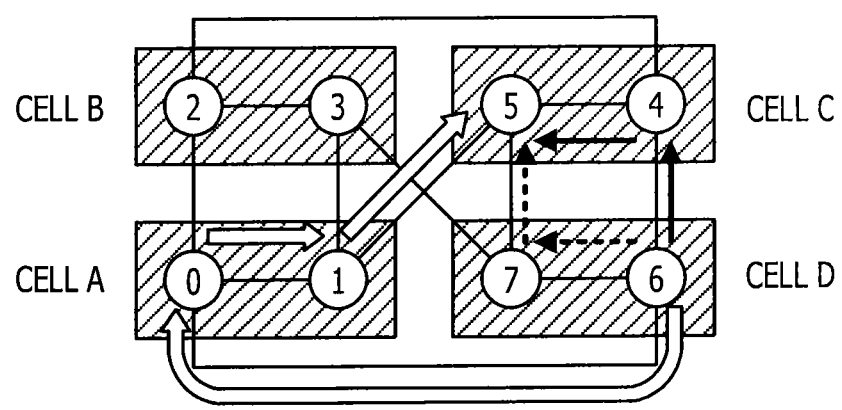
FIG. 28 is a diagram specifically illustrating the path determination method.

FIG. 28 illustrates paths in which the number of hops is three or less, from among paths from the CPU 6 to the CPU 5. In FIG. 28, a path "CPU 6→CPU 0→CPU 1→CPU 5", a path "CPU 6→CPU 4→CPU 5", and a path "CPU 6→CPU 7→CPU 5" are illustrated. Here, as the path from the CPU 6 to the CPU 5, the path "CPU 6→CPU 0→CPU 1→CPU 5" in which all of the intermediate CPUs are included in the control cell is selected.

Figure 29:
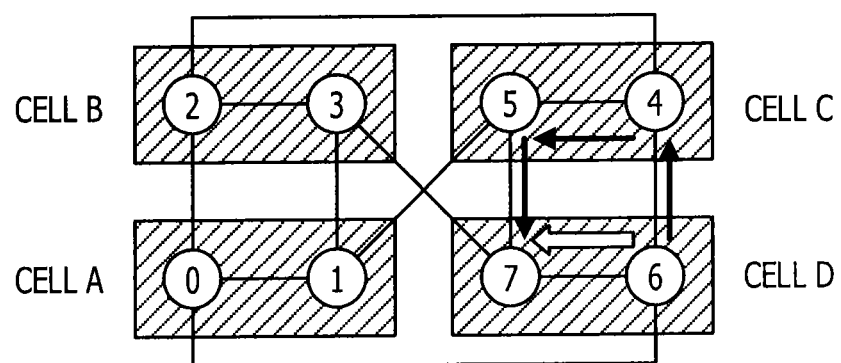
FIG. 29 is a diagram specifically illustrating the path determination method.

FIG. 29 illustrates paths in which the number of hops is three or less, from among paths from the CPU 6 to the CPU 7. In FIG. 29, a path "CPU 6→CPU 7" and a path "CPU 6→CPU 4→CPU 5→CPU 7" are illustrated. Here, as the path from the CPU 6 to the CPU 7, the path "CPU 6→CPU 7" in which the number of hops is one is selected.

A path in which the transmission source CPU is the CPU 7 is described below.

Figure 30:
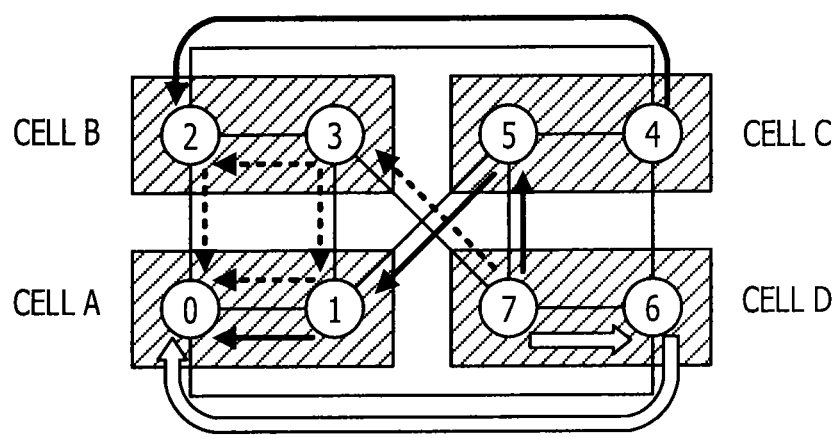
FIG. 30 is a diagram specifically illustrating the path determination method.

FIG. 30 illustrates paths in which the number of hops is three or less, from among paths from the CPU 7 to the CPU 0. In FIG. 30, a path "CPU 7→CPU 6→CPU 0", a path "CPU 7→CPU 5→CPU 1→CPU 0", a path "CPU 7→CPU 3→CPU 1→CPU 0", and a path "CPU 7→CPU 3→CPU 2→CPU 0" are illustrated. Here, as the path from the CPU 7 to the CPU 0, the path "CPU 7→CPU 6→CPU 0" that merely passes through the cell that includes the transmission source CPU, the control cell, and the cell that includes the destination CPU is selected.

Figure 31:
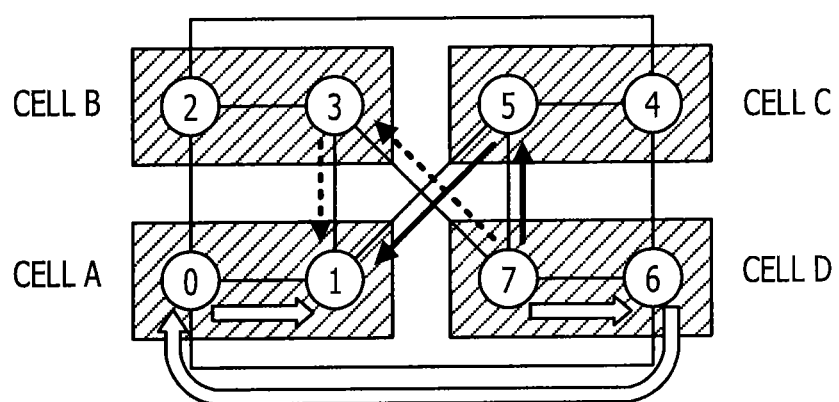
FIG. 31 is a diagram specifically illustrating the path determination method.

FIG. 31 illustrates paths in which the number of hops is three or less, from among paths from the CPU 7 to the CPU 1. In FIG. 31, a path "CPU 7→CPU 6→CPU 0→CPU 1", a path "CPU 7→CPU 5→CPU 1", and a path "CPU 7→CPU 3→CPU 1" are illustrated. Here, as the path from the CPU 7 to the CPU 1, the path "CPU 7→CPU 6→CPU 0→CPU 1" that merely passes through the cell that includes the transmission source CPU, the control cell, and the cell that includes the destination CPU is selected.

Figure 32:
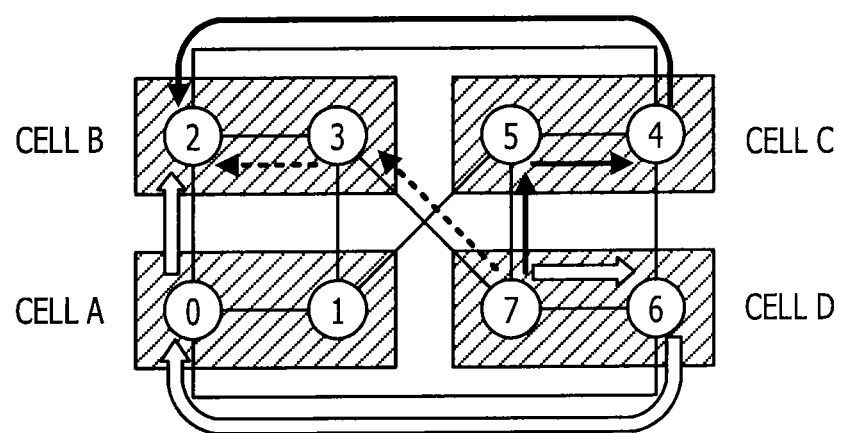
FIG. 32 is a diagram specifically illustrating the path determination method.

FIG. 32 illustrates paths in which the number of hops is three or less, from among paths from the CPU 7 to the CPU 2. In FIG. 32, a path "CPU 7→CPU 6→CPU 0→CPU 2", a path "CPU 7→CPU 5→CPU 4→CPU 2", and a path "CPU 7→CPU 3→CPU 2" are illustrated. Here, as the path from the CPU 7 to the CPU 2, the path "CPU 7→CPU 6→CPU 0→CPU 2" that merely passes through the cell that includes the transmission source CPU, the control cell, and the cell that includes the destination CPU is selected.

Figure 33:
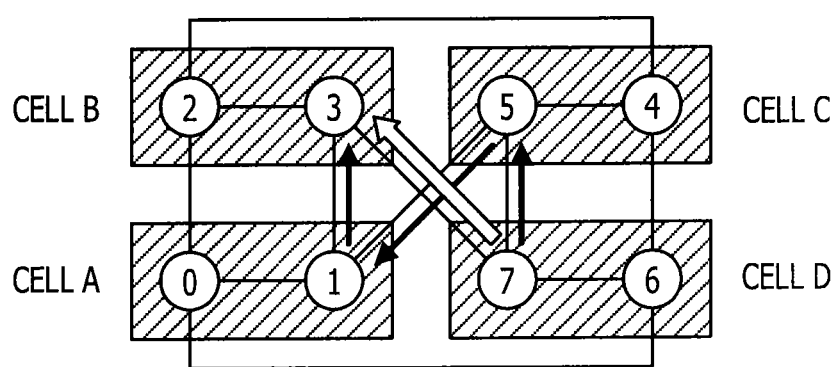
FIG. 33 is a diagram specifically illustrating the path determination method.

FIG. 33 illustrates paths in which the number of hops is three or less, from among paths from the CPU 7 to the CPU 3. In FIG. 33, a path "CPU 7→CPU 3" and a path "CPU 7→CPU 5→CPU 1→CPU 3" are illustrated. Here, as the path from the CPU 7 to the CPU 3, the path "CPU 7→CPU 3" in which the number of hops is one is selected.

Figure 34:
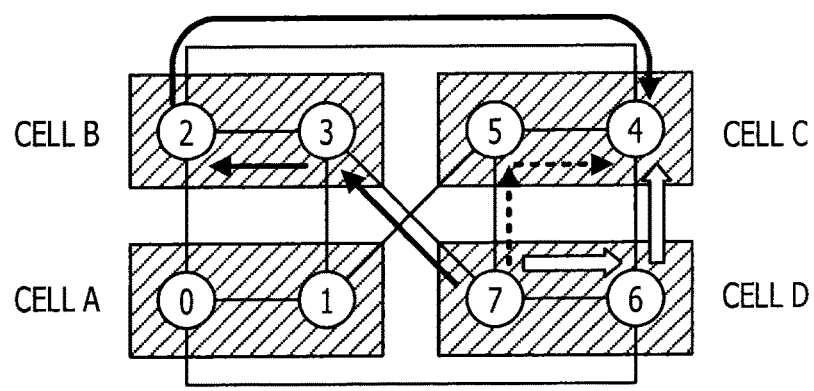
FIG. 34 is a diagram specifically illustrating the path determination method.

FIG. 34 illustrates paths in which the number of hops is three or less, from among paths from the CPU 7 to the CPU 4. In FIG. 34, a path "CPU 7→CPU 3→CPU 2→CPU 4", a path "CPU 7→CPU 5→CPU 4", and a path "CPU 7→CPU 6→CPU 4" are illustrated. Here, as the path from the CPU 7 to the CPU 4, the path "CPU 7→CPU 6→CPU 4" that passes through a CPU that is included in the cell including the transmission source CPU and is closer to the control cell as compared with the transmission source CPU (here, the CPU 6) is selected.

Figure 35:
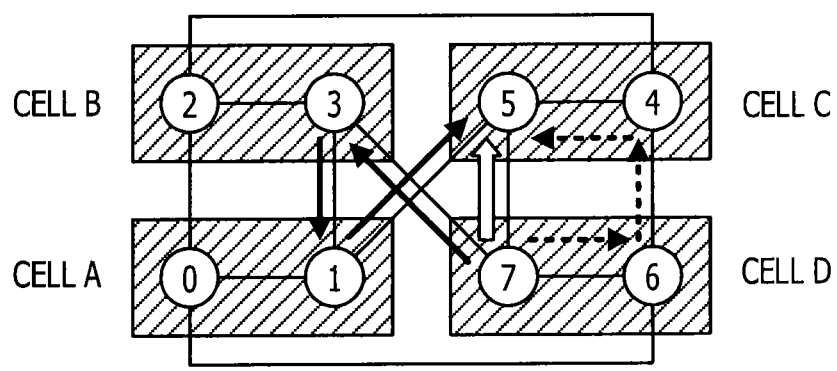
FIG. 35 is a diagram specifically illustrating the path determination method.

FIG. 35 illustrates paths in which the number of hops is three or less, from among paths from the CPU 7 to the CPU 5. In FIG. 35, a path "CPU 7→CPU 3→CPU 1→CPU 5", a path "CPU 7→CPU 5", and a path "CPU 7→CPU 6→CPU 4→CPU 5" are illustrated. Here, as the path from the CPU 7 to the CPU 5, the path "CPU 7→CPU 5" in which the number of hops is one is selected.

Figure 36:
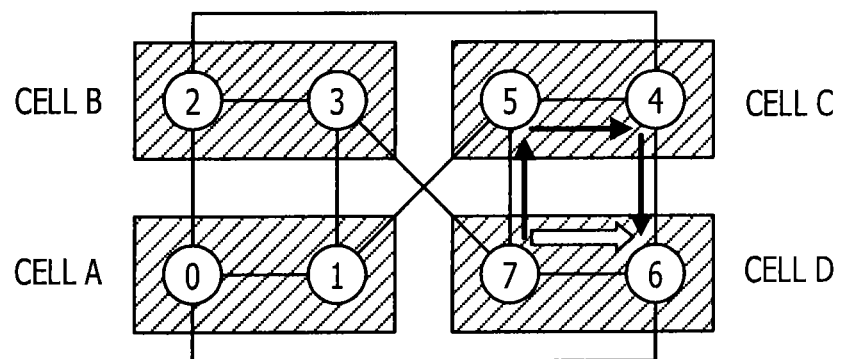
FIG. 36 is a diagram specifically illustrating the path determination method.

FIG. 36 illustrates paths in which the number of hops is three or less, from among paths from the CPU 7 to the CPU 6. In FIG. 36, a path "CPU 7→CPU 5→CPU 4→CPU 6" and a path "CPU 7→CPU 6" are illustrated. Here, as the path from the CPU 7 to the CPU 6, the path "CPU 7→CPU 6" in which the number of hops is one is selected.

The embodiments are described above, but the technology discussed herein is not limited to the embodiments. For example, a function block configuration of the above-described server 1000 may not be matched with the actual program module configuration.

In addition, the configuration of each of the above-described tables is merely an example, and the embodiment may not be limited to the above-described configuration. In addition, in the processing flow, processing order may be changed as long as the processing result is not changed. In addition, the processing may be executed in parallel.

The example in which there are the four cells, and the two CPUs are included in each of the cells is illustrated above, but the embodiment is not limited to such an example.

In addition, as described above, the first CPU and the second CPU are determined based on a distance from the control cell, but the first CPU and the second CPU may be determined based on a distance from the control CPU.

In addition, in order to accelerate the speed of the processing, pieces of information on paths may be calculated, and stored as a table in advance.

The above-described embodiments are summarized as follows.

An information processing device according to the first embodiment includes (A) a plurality of processors that each of which is directly coupled to at least some of the plurality of processors. In addition, a first processor from among the plurality of processors (a1) calculates one or a plurality of communication paths between a second processor from among the plurality of processors and a third processor from among the plurality of processors, which is different from the second processor, (a2) identifies a communication path in which the second processor and the third processor are directly coupled to each other, or a communication path in which a processor other than the second processor and the third processor on the communication path is not a target of dynamic reconfiguration, from among the plurality of calculated communication paths, and (a3) transmits information on the identified communication path, to a processor on the identified communication path.

Therefore, the communication path is not affected by the dynamic reconfiguration, so that an identical communication path may be used before and after the dynamic reconfiguration.

In addition, each of the above-described plurality of processors belongs to one of a plurality of groups (for example, cells in the embodiment), and the above-described first processor may not be a target of the dynamic reconfiguration. In addition, the above-described first processor (a4) removes, from the information processing device, processors in order from a processor with which there are a large number of hops to a group that includes the first processor, from among one or a plurality of processors that are included in a group that is to be removed from among the plurality of groups, and (a5) adds, to the information processing device, processors in order from a processor with which there are a small number of hops to the group that includes the first processor, from among one or a plurality of processors that are included in a group that is to be added. Therefore, in a case where the dynamic reconfiguration is performed for each of the groups, removal and addition of a processor may be performed appropriately.

In addition, a first group to which the above-described first processor belongs may not be a target of the dynamic reconfiguration. In addition, in the above-described processing of identifying the communication path may include, (a21) in a case where there is no communication path in which the second processor and the third processor are directly coupled to each other, and there is no communication path that passes through a processor that is not the target of the dynamic reconfiguration between the second processor and the third processor, a processing of identifying a communication path that includes only a processor of the first group, a processor of a group to which the second processor belongs, and a processor of a group to which the third processor belongs. Therefore, an identical communication path may be used before and after the dynamic reconfiguration.

In addition, in the above-described processing of identifying the communication path may include, (a22) in a case where there is no communication path that includes only the processor of the first group, the processor of the group to which the second processor belongs, and the processor of the group to which the third processor belongs, a processing of identifying a communication path that includes a processor that belongs to the group to which the second processor belongs, and with which a number of hops to the processor of the first group is small as compared with a number of hops to the processor of the first group from the second processor. Therefore, an identical communication path may be used before and after the dynamic reconfiguration.

A path determination method according to the second embodiment is executed by a first processor that is one of a plurality of processors that each of which is coupled to at least some of the plurality of processors. In addition, the path determination method includes processing of (B) calculating one or a plurality of communication paths between a second processor from among the plurality of processors and a third processor from among the plurality of processors, which is different from the second processor, (C) identifying a communication path in which the second processor and the third processor are directly coupled to each other from among the calculated one or the plurality of communication paths, or a communication path in which a processor other than the second processor and the third processor on the communication path is not a target of dynamic reconfiguration, and (D) transmitting information on the identified communication path, to a processor on the identified communication path.

A program may be created that is used to cause a computer to execute the processing by the above-described method, and the program is stored, for example, in a computer-readable storage medium or a storage device such as a flexible disk, a CD-ROM, a magneto optical disk, a semiconductor memory, or a hard disk. An intermediate processing result is temporarily stored in a storage device such as a main memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
a plurality of processors each of which is coupled to at least one other processor of the plurality of processors, each of the plurality of processors belonging to one of a plurality of groups, wherein
a first processor from among the plurality of processors belonging to a first group of the plurality of groups is configured to perform a path determination process,
processors included in a second group from among the plurality of groups are candidates for at least one of a hot addition or a hot removal, and
the path determination process includes:
calculating a plurality of communication paths between a second processor from among the plurality of processors and a third processor from among the plurality of processors, which is different from the second processor;
identifying a communication path that does not pass through a processor that is a candidate for the at least one of the hot addition or the hot removal, as a path to be used, from among the plurality of calculated communication paths; and
transmitting information on the identified path to be used, to a processor on the identified communication path; and
the processor that receives, from the first processor, the information on the identified path to be used executes communication processing between the second processor and the third processor by using the communication path that is indicated by the received information on the path to be used, and
the first processor is configured to
logically remove, from the information processing device, processors included in the second group in order from a processor having a greatest number of hops to the first group to a processor having a fewest number of hops to the first group when the processors included in the second group are candidates for the hot removal, and execute the path determination process after each of the processors included in the second group are logically removed; and
logically add, to the information processing device, processors included in the second group in order from a processor having a fewest number of hops to the first group to a processor having highest number of hops to the first group when the processors included in the second group are candidates for the hot addition, and execute the path determination process after each of the processors included in the second group are logically added.

2. The information processing device according to claim 1, wherein
in a case where there is a path in which the second processor and the third processor are directly coupled to each other, from among the plurality of calculated communication paths, the first processor identifies the path in which the second processor and the third processor are directly coupled to each other, as the path to be used, and
in a case where there is no path in which the second processor and the third processor are directly coupled to each other from among the plurality of calculated communication paths, the first processor identifies, as the path to be used, a communication path in which a number of hops is smallest from among a plurality of communication paths that pass through a processor that is not the candidate for at least one of the hot addition or the hot removal.

3. The information processing device according to claim 1, wherein
in the identifying the communication path by the first processor,
in a case where there is no communication path in which the second processor and the third processor are directly coupled to each other, and there is no communication path that passes through a processor that is not the candidate for at least one of the hot addition or the hot removal between the second processor and the third processor, the first processor identifies a communication path that includes only a processor of the first group, a processor of a group to which the second processor belongs, and a processor of a group to which the third processor belongs.

4. The information processing device according to claim 3, wherein in the identifying the communication path by the first processor, in a case where there is no communication path that includes only the processor of the first group, the processor of the group to which the second processor belongs, and the processor of the group to which the third processor belongs, the first processor identifies a communication path that includes a processor that belongs to the group to which the second processor belongs, and with which a number of hops to the processor of the first group is less than a number of hops to the processor of the first group from the second processor.

5. A method of determination of a communication path between a plurality of processors included in an information processing device, each of the plurality of processors being coupled to at least one other processor of the plurality of processors, each of the plurality of processors belonging to one of a plurality of groups, a first processor from among the plurality of processors belonging to a first group of the plurality of groups being configured to perform a path determination process, processors included in a second group from among the plurality of groups being candidates for at least one of a hot addition or a hot removal, the method comprising:

logically removing, by the first processor, from the information processing device, processors included in the second group in order from a processor having a greatest number of hops to the first group to a processor having a fewest number of hops to the first group when the processors included in the second group are candidates for the hot removal, and executing the path determination process after each of the processors included in the second group are logically removed; and logically adding, by the first processor, to the information processing device, processors included in the second group in order from a processor having a fewest number of hops to the first group to a processor having highest number of hops to the first group when the processors included in the second group are candidates for the hot addition, and executing the path determination process after each of the processors included in the second group are logically added, wherein the path determination process includes calculating, by the first processor, a plurality of communication paths between a second processor from among the plurality of processors and a third processor from among the plurality of processors, which is different from the second processor;

identifying, by the first processor, a communication path that does not pass through a processor that is a candidate for the at least one of the hot addition or the hot removal, as a path to be used, from among the plurality of calculated communication paths;

transmitting, by the first processor, information on the identified path to be used, to a processor on the identified communication path; and executing, by the processor that receives, from the first processor, the information on the identified path to be used, communication processing between the second processor and the third processor using the communication path that is indicated by the received information on the identified path.

6. The method according to claim 5, wherein the identifying, by the first processor, includes:

in a case where there is a path in which the second processor and the third processor are directly coupled to each other, from among the plurality of calculated communication paths, identifying the path in which the second processor and the third processor are directly coupled to each other, as the path to be used, and in a case where there is no path in which the second processor and the third processor are directly coupled to each other from among the plurality of calculated communication paths, identifying, as the path to be used, a communication path in which a number of hops is smallest from among a plurality of communication paths that pass through a processor that is not the candidate for the at least one of the hot addition or the hot removal.

7. The method according to claim 5, wherein the identifying, by the first processor, includes:

identifying a communication path that includes only a processor of the first group to which the first processor belongs, a processor of a group to which the second processor belongs, and a processor of a group to which the third processor belongs when there is no communication path in which the second processor and the third processor are directly coupled to each other, and there is no communication path that passes through a processor that is not the candidate for the at least one of the hot addition or the hot removal between the second processor and the third processor, wherein the first group is not the target of the dynamic reconfiguration.

8. The method according to claim 7, wherein the identifying, by the first processor, includes: identifying a communication path that includes a processor that belongs to the group to which the second processor belongs, and with which a number of hops to the processor of the first group is less than a number of hops to the processor of the first group from the secondprocessor when there is no communication path that includes only the processor of the first group, the processor of the group to which the second processor belongs, and the processor of the group to which the third processor belongs.

* * * * *